Patented Feb. 14, 1939

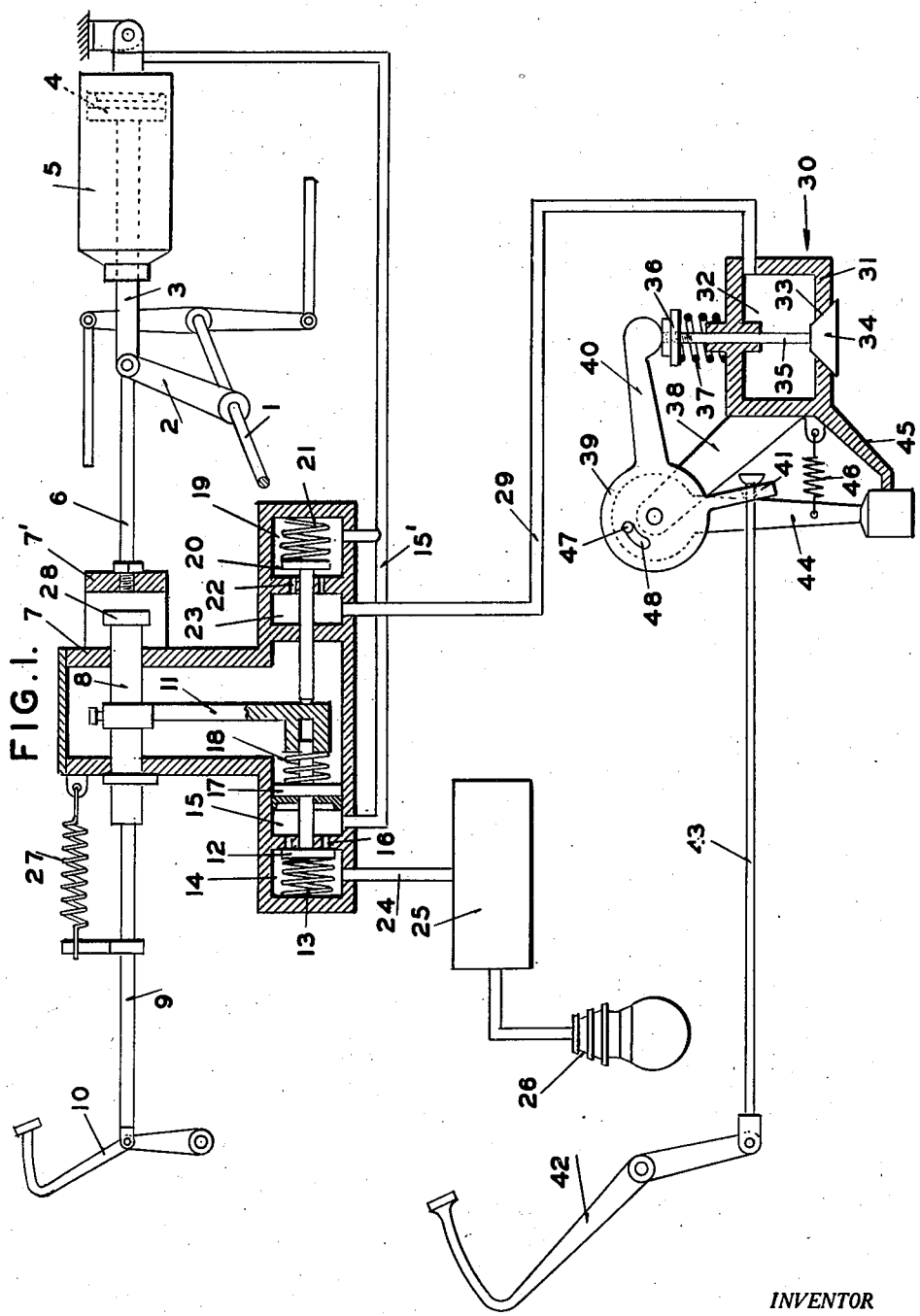

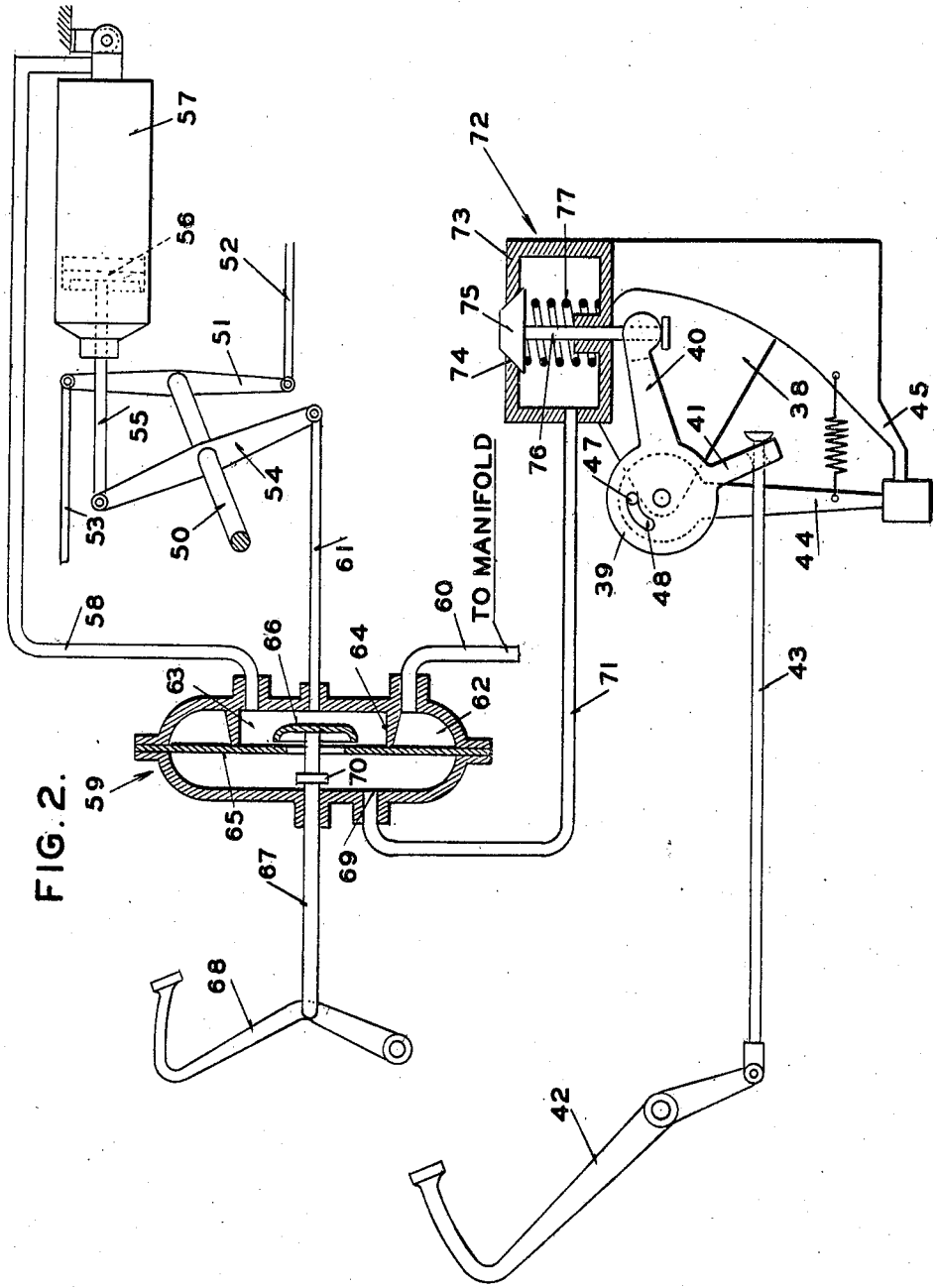

2,146,803

UNITED STATES PATENT OFFICE 2,146,803

CONTROL MECHANISM FOR POWER ACTUATED BRAKES

Burns Dick, Ferguson, Mo., assignor to Wagner Electric Corporation, St. Louis, Mo., a corporation of Delaware Application August 28, 1937, Serial No. 161,391

11 Claims. (Cl. 192—13)

My invention relates to power brakes and more particularly to means for holding the brakes in applied position under certain conditions.

One of the objects of my invention is to provide improved means for holding fluid power brakes in applied position by a predetermined pressure which is automatically effective only when the vehicle is stopped and power is not being applied to the vehicle wheels.

Another object of my invention is to provide gravity-controlled means for automatically maintaining either vacuum power brakes or air pressure power brakes applied when the vehicle is stopped.

Other objects will become apparent from the following description taken in connection with the accompanying drawings in which Figure 1 is a schematic view of an air pressure actuated braking mechanism and clutch control mechanism showing my invention associated therewith, parts being in cross section; and Figure 2 is a schematic view of a vacuum-operated braking mechanism and clutch control mechanism showing my invention associated therewith, parts being in cross section.

Referring to Figure 1 in detail, the numeral 1 indicates the usual cross shaft of a motor vehicle which is adapted to actuate the wheel braking mechanism in a well-known manner. The shaft 1 is provided with an actuating arm 2 which is connected by means of a rod 3 with the piston 4 of a power cylinder 5, the latter member being pivoted to a stationary part of the vehicle chassis. The arm 2 also has pivoted thereto a rod 6 which is secured to a valve casing 7 by means of the casing bracket 7'. The valve shown by way of example is a combined "follow-up and metering valve" which is adapted to control the application and exhaust of air under pressure to the cylinder 5 but other types of control valves may be employed if desired. Slidably mounted in the valve casing is a rod 8 in alignment with rod 6, this rod being connected by means of a rod 9 with the brake pedal 10. It is thus seen that valve casing 7 is supported in a suspended position on rods 6 and 8 which are permitted to have relative movement for controlling the valve elements within the casing, the controlling element being an arm 11 carried by rod 8.

The application valve 12 is normally biased to the closed position by spring 13 in the application chamber 14 which is in communication with a second chamber 15 by means of openings 16 controlled by valve 12. The stem of valve 12 extends within chamber 15 and is provided with a piston 17. A second spring 18 is interposed between the valve stem and the actuating arm 11.

The chamber 15 is connected by a conduit 15' with the power cylinder 5 and it also communicates with the exhaust chamber 19 located on the rear side of arm 11. The exhaust chamber is provided with an exhaust valve 20 normally biased to closed position by means of the spring 21, this valve controlling the openings 22 leading to the atmosphere through chamber 23. The exhaust valve 20 is provided with a stem extending to a point adjacent arm 11.

The application chamber 14 is connected by a conduit 24 to a suitable source of power which in this instance comprises a pressure tank 25 and an air compressor 26. This air compressor is shown as a separate unit but may be driven directly by the vehicle engine or by a suitable suction motor operated from the intake manifold of the engine.

In operation of the above described braking system the exhaust valve 20 is normally held in open position by arm 11 when the brake pedal 10 is in its inoperative position, this condition being caused by spring 27 between the valve casing and rod 9 which normally biases rod 8 and its attached arm 11 to its extreme right position. Upon actuation of the brake pedal 10 to apply the brakes, rod 8 is moved relatively to the valve casing permitting exhaust valve 20 to close and causing arm 11 to compress spring 18 and force the application valve 12 to open position, thereby admitting fluid under pressure from the pressure tank 25 to the power cylinder 5 and causing piston 4 to be moved to the left to rotate the cross shaft 1 and apply pressure to the brakes. The movement of arm 2 by means of piston 4 and connecting rod 6 will cause the valve casing to "follow-up" the movement of rod 8, thus permitting the application valve 12 to close, the exhaust valve 20 remaining closed. Further movement of brake pedal 10 will again open the application valve and admit additional air under pressure to the power cylinder to apply further pressure to the brakes with the same "follow-up" action of the valve casing.

When the brake pedal 10 is released, spring 27 will cause rod 8 to be moved relatively to the valve casing and open exhaust valve 20 to release the air in the power cylinder 5, said valve remaining open until it is desired to again apply the brakes.

The piston 17 in chamber 15 prevents an excess of air under pressure from entering the power cylinder when the application valve is open since the pressure in chamber 15 will cause the piston to move to the right against the action of spring 18, thereby closing valve 12. In case of failure of the power system, rod 8 is provided with a shoulder 28 whereby shaft 1 may be actuated directly by means of the brake pedal.

In accordance with my invention I provide the exhaust chamber 23 with a conduit 29 which is connected to a pressure relief valve mechanism 30. This valve mechanism comprises a casing 31 provided with a chamber 32 having communication with the atmosphere by opening 33. The opening is controlled by a valve element 34 to which is connected a stem 35 extending through the casing 31 to the exterior of the casing and carried on the end of the stem is an adjustable shoulder 36 cooperating with a spring 37 for holding the valve element 34 seated. The valve element opens toward the atmosphere and the pressure necessary to open the valve may be predetermined by proper adjustment of shoulder 36 on the valve stem. It is thus seen that by means of this valve only a predetermined amount of air can be exhausted from the power cylinder when the exhaust valve 20 of the control valve mechanism is in a position to permit the air to be exhausted. Thus with valve 34 closed under a predetermined spring pressure, the brakes can be held applied by a pressure determined by the valve mechanism 30. Therefore, notwithstanding the fact that the brake pedal has been released to permit release of the brakes, the brakes, nevertheless, can be maintained applied to hold the vehicle from rolling on any incline upon which the vehicle may have been stopped.

In accordance with my invention I also control the valve mechanism 30 by means of the clutch mechanism on the vehicle. The casing 31 is provided with a suitable arm 38 upon which is pivotally mounted a lever 39 having one arm 40 overlying the stem of the valve element 34 and another arm 41 connected to the clutch pedal 42 by means of a link 43. The arm 38 also has pivotally mounted thereon, coaxially with lever 39, a pendulum 44 which is normally held in engagement with the stop 45 on the valve casing by means of a very light spring 46. The top portion of the pendulum carries a pin 47 which extends into a slot 48 of lever 39, thus resulting in a mechanism whereby the pendulum can rotate lever 39 in a clockwise direction but permitting the lever 39 to be moved in a clockwise direction without movement of the pendulum. The connection between lever 39 and the clutch pedal is such that when the clutch is disengaged (as shown in Figure 1) and the pendulum is against stop 45, valve element 34 will be closed. When the clutch is in engaged position lever 39 will be swung in a clockwise direction and thus open valve element 34 against the action of spring 37.

In operation when the vehicle is moving along a highway and the clutch is engaged, the brakes may be applied and released at will by actuation of the brake pedal since valve 34 under these conditions will be held open by arm 39. If the clutch should be disengaged under these conditions, the brakes may still be applied and released by operation of the brake pedal since valve 34 will be held in open position by pendulum 44 since the deceleration of the vehicle by the application of the brakes will result in the pendulum swinging forwardly and by pin 47 operate lever 39 to hold valve element 34 open. If the vehicle should be brought to a stop facing upwardly on an inclined roadway and the brakes applied or held applied, the brakes will automatically be maintained applied under a predetermined pressure determined by valve 34 and without the necessity of holding the brake pedal depressed. Under these conditions the clutch will be disengaged, the pendulum will be against stop 45, and valve 34 will be closed as shown in Figure 1. If the brakes have been applied with pressure greater than that which can be held in the system by valve 34, the excess pressure will be released to atmosphere through valve 34 as soon as the main control valve permits the air under pressure in the power cylinder to be released.

From the foregoing it is seen that by means of the improved brake holding mechanism only a predetermined amount of pressure is maintained in the brake lines when it is desired to hold the vehicle stopped on an incline. Thus there is no strain on the braking system which would be present if the brakes were held applied under excessive pressure which may have been used to stop the vehicle. Also, by controlling the pressure relief valve by means of the pendulum, there is no danger of the relief valve being operated during deceleration of the vehicle whereby the brakes may become "tied up". By having the brake holding means embodied in a braking system in the manner disclosed, there is no necessity for the operator to hold the brake pedal in brake applied position when the vehicle is stopped in order to prevent the vehicle from rolling backward and thus the operator's right foot is free to be used to operate other control members on the vehicle, as for example, the accelerator preparatory to starting or the starter pedal in the event the engine has become inoperative. The brakes are always automatically released when the clutch is engaged and at the time that power is beginning to be applied to the vehicle wheels.

Referring to Figure 2, I have shown my invention associated with a vacuum-operated braking system. In this figure, 50 indicates the cross shaft of the vehicle which is provided at its opposite ends with levers 51 (only one being shown) which are connected in a well-known manner by rods 52 and 53 to the front and rear brakes of the vehicle. The central portion of the cross shaft has secured thereto a lever 54 for actuating the brakes, the upper arm of this lever being connected by means of a rod 55 to the piston 56 of the suction motor 57. The chamber of the suction motor ahead of piston 56 is connected by means of conduit 58 with the control valve 59 which in turn is connected by conduit 60 with the manifold of the engine. The control valve shown is of well-known construction being attached to rod 61 which is connected to the lower arm of lever 54. The conduit 60 is in communication with valve chamber 62 and conduit 58 is in communication with valve chamber 63, these chambers being separated by the annular wall 64 and controlled by the valve diaphragm 65. This valve diaphragm is actuated by means of the annular valve element 66 carried by rod 67 connected to the usual vehicle brake pedal 68.

From the above structure it is readily seen that when the brake pedal 68 is depressed, element 66 will flex the valve diaphragm 65, thereby placing chamber 62 in communication with chamber 63 and the suction motor in communication with the manifold, thus causing piston 56 to be moved to the right to apply the brakes. Since the control valve 59 is attached to brake rod 61, the valve diaphragm will be seated by the "follow-up" action of rod 61. Additional movement of the brake pedal will again unseat the diaphragm and cause additional pressure to be applied to the brakes. Release of the brake pedal unseats valve element 66 and places conduit 58 in communication with the atmosphere through the port 69, thereby releasing the brakes. In order to provide for manual actuation of the brakes in case of failure of the power means, rod 67 is provided with a shoulder 70 for engagement with the valve casing whereby the brake lever 54 may be directly actuated.

In accordance with my invention the port 69 communicates with a conduit 71 which is connected to a pressure relief valve mechanism 72. This valve mechanism comprises a casing 73 having an opening 74 communicating with the atmosphere, the opening being controlled by a valve element 75 mounted upon a valve stem 76 which extends to the exterior of the valve casing. A spring 77 normally biases the valve element 75 to closed position, thus preventing air under atmospheric pressure from entering the valve casing except when the pressure differential is of a predetermined value. The valve stem 76 is controlled by the clutch mechanism and a pendulum in identically the same manner as the valve stem 35 shown in Figure 1 and it is not believed necessary to describe this structure in detail, reference being had to the previous description.

In operation when the vehicle is moving along a roadway with the clutch engaged, the brakes may be applied and released at will since under these conditions the valve element 75 will be unseated by the engaged condition of the clutch. If the clutch should be disengaged, valve element 75 would still be maintained in open position when the brakes are applied since the pendulum will swing forwardly under the action of inertia and maintain the valve open. When the vehicle is brought to a stop facing upwardly on an inclined roadway and the clutch is disengaged, as shown in Figure 1, the brakes may be applied and held applied under predetermined pressure without maintaining the foot on the brake pedal. Under these conditions the valve element 75 will be free to be seated by the action of spring 77 and also the main control valve 59 will be in a position to permit air under atmospheric pressure to enter the suction motor 57, the amount of air admitted, however, being determined by spring 77. When it is desired to start the vehicle, release of the clutch will cause the valve element 75 to be unseated and atmospheric pressure can enter the suction motor to release the brakes. It is thus seen that the structure disclosed in Figure 2 with respect to the suction-operated brake produces the same results as the structure shown in Figure 1.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided with a braking assembly, a fluid pressure operated motor comprising a movable element for actuating the assembly, means including a main control valve for causing fluid pressure to act on the movable element of the motor and for connecting the motor to the atmosphere to cause it to be inoperative, other valve means associated with said means and positioned in the atmosphere connection from the main control valve for maintaining an effective operating fluid pressure acting on the movable element of the fluid motor notwithstanding said main control valve has been moved to a position normally permitting said fluid motor to be inoperative, and means operative under the action of inertia during deceleration of the vehicle for causing said second named valve means to be inoperative and under the action of gravity when the vehicle is stopped for permitting said second named valve means to be operative.

2. In a motor vehicle provided with a clutch mechanism and with a braking assembly, a fluid pressure operated motor comprising a movable element for actuating the assembly, means including a main control valve for causing fluid pressure to act on the movable element of the motor and for connecting the motor to the atmosphere to cause it to be inoperative, other valve means associated with said means and positioned in the atmosphere connection from the main control valve for maintaining an effective operating fluid pressure acting on the movable element of the fluid motor notwithstanding said main control valve has been moved to a position normally permitting said fluid motor to be inoperative, means operative under the action of inertia during deceleration of the vehicle for causing said second named valve means to be inoperative and under the action of gravity when the vehicle is stopped for permitting said second named valve means to be operative, and means controlled by the clutch mechanism when in clutch-engaged-position for causing said second named valve means to be inoperative.

3. In a motor vehicle provided with a clutch mechanism and with a braking assembly, a fluid pressure operated motor comprising a movable element for actuating the assembly, means including a main control valve for causing fluid pressure to act on the movable element of the motor, other valve means associated with said means for maintaining an effective operating fluid pressure acting on the movable element of the fluid motor notwithstanding said main control valve has been moved to a position normally permitting said fluid motor to be inoperative, said other valve means embodying means for predetermining the value of said effective operating fluid pressure, means operative under the action of inertia during deceleration of the vehicle for causing said second named valve means to be inoperative and under the action of gravity when the vehicle is stopped for permitting said valve means to be operative, and means controlled by the clutch mechanism when in clutch-engaged position for causing said second named valve means to be inoperative.

4. In a motor vehicle, a braking assembly, a fluid motor including a movable element for actuating the braking assembly, a source of pressure connected to the fluid motor, a main control valve for admitting fluid under pressure to the fluid motor and exhausting it to atmosphere through a conduit in constant communication with the atmosphere, valve means associated with the exhaust conduit for preventing the fluid under pressure from being exhausted from the fluid motor when so permitted by the main control valve, and means governed by the action of inertia and the action of gravity for controlling said last named valve means.

5. In a motor vehicle, a clutch mechanism, a braking assembly, a fluid motor including a movable element for actuating the braking assembly, a source of pressure connected to the fluid motor, a main control valve for admitting fluid under pressure to the fluid motor and exhausting it to atmosphere through a conduit in constant communication with the atmosphere, valve means associated with the exhaust conduit for preventing the fluid under pressure from being exhausted from the fluid motor when so permitted by the main control valve, means governed by the action of inertia and the action of gravity for controlling said last named valve means, and means for causing said last named valve means to be ineffective when the clutch mechanism is in clutch-engaged position.

6. In a motor vehicle, a clutch mechanism, a braking assembly, a fluid motor including a movable element for actuating the braking assembly, a source of pressure connected to the fluid motor, a main control valve for admitting fluid under pressure to the fluid motor and exhausting it to atmosphere through a conduit, pressure relief valve means associated with the exhaust conduit for preventing a predetermined amount of the fluid under pressure from being exhausted from the fluid motor when so permitted by the main control valve, means governed by the action of inertia and the action of gravity for controlling said last named valve means, and means for causing said last named valve means to be ineffective when the clutch mechanism is in clutch-engaged position.

7. In a motor vehicle, a braking assembly, a suction motor including a movable element for actuating the braking assembly, a source of suction, a main control valve for connecting the suction motor to the source of suction or to the atmosphere through a conduit in constant communication with the atmosphere, valve means associated with the atmospheric conduit for preventing air from entering the suction motor when so permitted by the main control valve, and means governed by the action of inertia and the action of gravity for controlling said last named valve.

8. In a vehicle, a clutch mechanism, a braking assembly, a suction motor including a movable element for actuating the braking assembly, a source of suction, a main control valve for connecting the suction motor to the source of suction or to the atmosphere through a conduit in constant communication with the atmosphere, valve means associated with the atmospheric conduit for preventing air from entering the suction motor when so permitted by the main control valve, means governed by the action of inertia and the action of gravity for controlling said last named valve, and means for causing said last named valve means to be ineffective when the clutch mechanism is in clutch-engaged position.

9. In a vehicle, a clutch mechanism, a braking assembly, a suction motor including a movable element for actuating the braking assembly, a source of suction, a main control valve for connecting the suction motor to the source of suction or to the atmosphere through a conduit, valve means associated with the atmospheric conduit for permitting only a predetermined amount of air to enter the suction motor when so permitted by the main control valve, means governed by the action of inertia and the action of gravity for controlling said last named valve, and means for causing said last named valve means to be ineffective when the clutch mechanism is in clutch-engaged position.

10. In a motor vehicle provided with means for disconnecting the vehicle wheels from the source of power of the vehicle and with a braking assembly, a fluid pressure operated motor comprising a movable element for actuating the assembly, operator-operated means for causing fluid pressure to act on the movable element, valve means for maintaining an effective operating fluid pressure acting on said movable element notwithstanding said operator-operated means has been moved to an inoperative position, means, operative when the disconnecting means is effective to permit power to be applied to the vehicle wheels, for causing said valve means to be inoperative, a pendulum associated with said last named means and adapted to cause said valve means to be inoperative as a result of the action of inertia on the pendulum during deceleration of the vehicle but only when the disconnecting means is in disconnected position.

11. In a motor vehicle provided with a clutch mechanism having a clutch pedal and with a braking assembly, a fluid pressure operated motor comprising a movable element for actuating the assembly, operator-operated means for causing fluid pressure to act on the movable element, valve means for maintaining an effective operating fluid pressure acting on said movable element notwithstanding said operator-operated means has been moved to an inoperative position, a bell-crank for operating said valve means, a connection between said bell-crank and the clutch pedal for causing said valve means to be ineffective when the clutch pedal is in clutch-engaged position, a pendulum pivotally mounted on the same axis as the bell-crank, and a connection between said pendulum and the bell-crank for causing said valve means to be inoperative as a result of the action of inertia on the pendulum during deceleration of the vehicle but only when the clutch pedal is in clutch-disengaged position.

BURNS DICK.